United States Patent
Kim et al.

(10) Patent No.: US 8,301,953 B2
(45) Date of Patent: Oct. 30, 2012

(54) METHOD AND DEVICE FOR ALLOCATING RESOURCES IN WIRELESS COMMUNICATION SYSTEM

(75) Inventors: Kang-Hee Kim, Busan (KR); Byung-Han Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 669 days.

(21) Appl. No.: 12/522,472

(22) PCT Filed: Dec. 11, 2007

(86) PCT No.: PCT/KR2007/006446
§ 371 (c)(1),
(2), (4) Date: Jul. 8, 2009

(87) PCT Pub. No.: WO2008/084921
PCT Pub. Date: Jul. 17, 2008

(65) Prior Publication Data
US 2010/0023831 A1    Jan. 28, 2010

(30) Foreign Application Priority Data

Jan. 8, 2007  (KR) .................. 10-2007-0001852
May 16, 2007  (KR) .................. 10-2007-0047412

(51) Int. Cl.
*G08C 25/02*    (2006.01)
*H04L 1/18*    (2006.01)

(52) U.S. Cl. ............... 714/748; 714/749; 455/7; 455/69

(58) Field of Classification Search ................ 714/748, 714/749; 455/7, 69
See application file for complete search history.

(56) References Cited

U.S. PATENT DOCUMENTS
2002/0168945 A1 *  11/2002  Hwang et al. ................. 455/69
2005/0281219 A1    12/2005  Kim et al.

FOREIGN PATENT DOCUMENTS
EP    1 557 968 A1    7/2005
KR    10-2006-0026813    3/2006
* cited by examiner

*Primary Examiner* — Sam Rizk
(74) *Attorney, Agent, or Firm* — Staas & Halsey LLP

(57) ABSTRACT

The present invention relates to a resource allocation device for minimizing delay of an uplink retransmission resource allocation process in a wireless communication system having a high data rate, and a method thereof. In the method, user data are received and an ACK/NACK state of the received data is determined, and when the NACK state of the received data is determined, retransmission resource allocation is requested, retransmission resources are allocated, and retransmission resource allocation information is generated to be transmitted.

11 Claims, 2 Drawing Sheets

METHOD AND DEVICE FOR ALLOCATING RESOURCES IN WIRELESS COMMUNICATION SYSTEM

CROSS REFERENCE TO RELATED APPLICATIONS

This application claims the benefit under 35 U.S.C. Section 371, of PCT International Application Number PCT/KR2007/006446, filed Dec. 11, 2007 and Korean Application Nos. 10-2007-0001852 filed Jan. 8, 2007 and 10-2007-0047412 filed May 16, 2007, the contents of all of which are incorporated herein by reference.

TECHNICAL FIELD

The present invention relates to a resource allocation device of a wireless communication system, and a method thereof. More particularly, the present invention relates to a device for minimizing delay of an uplink retransmission resource allocation process in a wireless communication system having a high data rate, and a method thereof.

This work was supported by the IT R&D program of MIC/IITA [2005-S-404-12, Research & Development of Radio Transmission Technology for 3G evolution].

BACKGROUND ART

Generally, in a wireless communication system, wireless terminals communicate with each other through a base station. In this case, a medium access control (MAC) method for shared radio resources and a radio resource allocation method are defined between the base station and the respective wireless terminals.

An uplink retransmission resource allocation method of the wireless communication system will now be described.

Respective wireless terminals request uplink resources from the base station when the terminals have uplink data to be transmitted to the base station. Then, the base station considers the uplink resource allocation requests of the wireless terminals and transmission data of the base station and allocates the uplink resources to the wireless terminals.

The wireless terminals transmit the uplink data to the base station after receiving the uplink resources. In this case, when an error occurs in the uplink data, the base station determines whether the error occurs in the uplink data. When the error occurs, the base station informs the wireless terminal of a hybrid automatic repeat request (HARQ) feedback channel or information.

The wireless terminal receiving the HARQ feedback channel or information on the error requests the uplink resources from the base station again when the wireless terminal has not received additional resources for retransmitting the uplink data. The base station allocates the uplink resources requested by the wireless terminal, and the wireless terminal retransmits the uplink data.

The above information disclosed in this Background section is only for enhancement of understanding of the background of the invention and therefore it may contain information that does not form the prior art that is already known in this country to a person of ordinary skill in the art.

DISCLOSURE

Technical Problem

As described above, a time for retransmitting the uplink data is delayed because there are various communication steps involved in allocating the uplink resources between the base station and the wireless terminal when the uplink data transmitted from the wireless terminal to the base station have an error, and the wireless terminal uses additional uplink resources to request the uplink resources from the base station to retransmit the uplink data and therefore the data rate of actual data is deteriorated.

Particularly, in the wireless communication system having a high data rate, a delay in allocating the uplink retransmission resources may cause a considerable communication problem.

Technical Solution

The present invention has been made in an effort to provide a resource allocation device for minimizing a delay in an uplink retransmission resource allocation process in a wireless communication system having a high data rate, and a method thereof.

In addition, the present invention has been made in an effort to provide various services and control information having a minimum delay by reducing an uplink retransmission resource allocation delay in a wireless interface of the wireless communication system.

Here, an up-link re-transmission delay-reductive resource allocation method and device for very high-speed wireless communication systems are provided. The present invention may be used as an efficient system configuration of layers 1 and 2 to process data at a high speed since an uplink retransmission resource allocation process is simplified and a delay time is minimized.

According to an exemplary embodiment of the present invention, in a method for allocating resources in a wireless communication system, an ACK/NACK state of received data is determined, resources for retransmission are allocated when the received data are in the NACK state, and information for allocating the retransmission resources is transmitted.

In addition, when the received data are in the NACK state, hybrid automatic repeat request (HARQ) ACK/NACK feedback information and the retransmission resource allocation information are separately transmitted according to a HARQ operation mode of a wireless terminal.

Further, it is determined whether a base station or a wireless terminal has a HARQ control initiative, and HARQ control information is added to the retransmission resource allocation information and the HARQ control information is transmitted according to the determined HARQ control initiative.

Still further, it is determined whether resources have been sequentially allocated, the ACK/NACK state of the received data is determined when the resources have been sequentially allocated, the information for allocating the resources is modified to be appropriate for retransmission corresponding to a HARQ operation mode of a wireless terminal, and the information is transmitted when the received data are in the NACK state.

According to another exemplary embodiment of the present invention, a resource allocation device in a wireless communication system includes a receiving unit, a controller, a resource allocation unit, and a transmitting unit. The receiving unit receives user data and determines an ACK/NACK state of the received data. The controller determines a NACK state of the received data and requests retransmission resource allocation. The resource allocation unit allocates retransmission resources according to a request from the controller, and generates retransmission resource allocation information. The transmitting unit transmits the retransmission resource allocation information of the resource allocation unit.

In this case, when the received data are in the NACK state, the controller requests HARQ ACK/NACK feedback transmission according to a HARQ operation mode of a wireless terminal, requests to add HARQ control information to the retransmission allocation information and transmit the HARQ control information according to a HARQ control initiative, or requests to transmit control information for controlling the wireless terminal to not request retransmission resource allocation.

Advantageous Effects

According to the exemplary embodiment of the present invention, since the uplink retransmission allocation process is simplified, a delay time is minimized, and a system configuration of layers 1 and 2 for efficiently processing data at a high speed may be formed.

MODE FOR INVENTION

Figure 1:
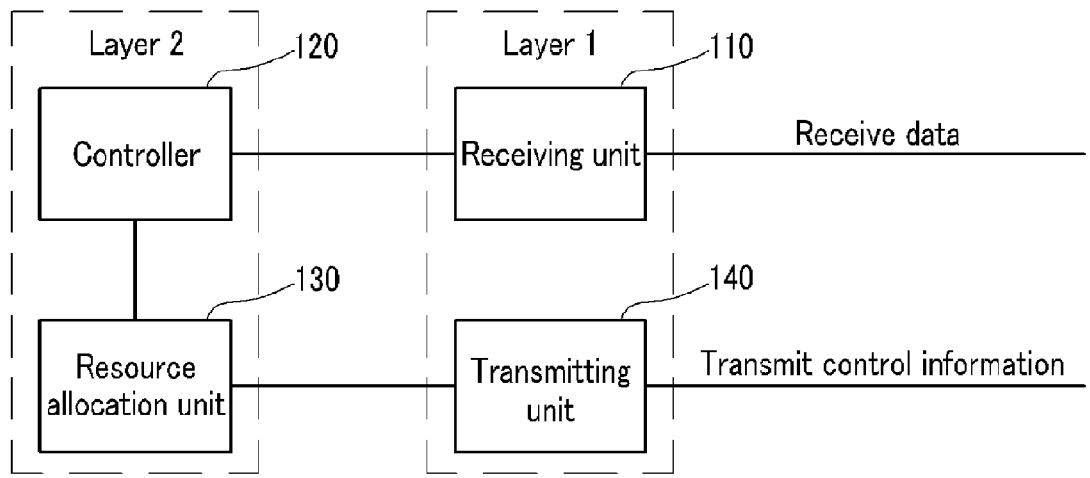
FIG. 1 is a diagram representing layers 1 and 2 of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements. The term "unit" used herein means one unit that processes a specific function or operation, and may be implemented by hardware, software, or a combination thereof.

A resource allocation device of a wireless communication system according to an exemplary embodiment of the present invention and a method thereof will be described.

FIG. 1 is a diagram representing layers 1 and 2 of the wireless communication system according to the exemplary embodiment of the present invention, and it shows an uplink retransmission resource allocation system for minimizing a retransmission resource allocation delay for a high speed wireless communication system and a wireless communication system that supports the uplink retransmission resource allocation system.

As shown in FIG. 1, the resource allocation device of the wireless communication system according to the exemplary embodiment of the present invention includes a receiving unit 110 for receiving data transmitted from a wireless terminal through a radio channel, a controller 120 for controlling the data according to an ACK/NACK state of the data transmitted to the receiving unit 110, a resource allocation unit 130 for allocating initial transmission and retransmission resources, and a transmitting unit 140 for transmitting resource allocation information or HARQ ACK/NACK feedback information to the wireless terminal through the radio channel.

Here, the controller 120 and the resource allocation unit 130 determine timing and method for transmitting the HARQ ACK/NACK feedback information according to a HARQ operation mode and method.

The receiving unit 110 that is a layer 1 decoding subsystem (L1dss) receives user data from a physical layer, decodes the received data, determines an ACK/NACK state of the decoded data, and informs the controller 120 of the determined ACK/NACK state of the received data.

The controller 120 that is a HARQ control subsystem (HQCSS) performs HARQ ACK/NACK control based on the ACK/NACK state of the received data transmitted from the receiving unit 110. In addition, the controller 120 determines whether a state of the received data transmitted from the receiving unit 110 is an NACK state, and requests the resource allocation unit 130 to allocate retransmission resources. Further, the controller 120 requests the resource allocation unit 130 to transmit the HARQ ACK/NACK feedback according to the HARQ operation mode and method of the wireless terminal. Still further, the controller 120 requests the resource allocation unit 130 to transmit the resource allocation information according to a HARQ control initiative while adding HARQ control information to the resource allocation information. In addition, the controller 120 requests the resource allocation unit 130 to transmit control information so that the wireless terminal may not request retransmission resource allocation.

The resource allocation unit 130 that is a resource allocation subsystem (ReASS) allocates uplink and downlink resources. In addition, the resource allocation unit 130 receives a retransmission resource allocation request from the controller 120 to allocate the retransmission resources, and applies the control information (e.g., the retransmission resource allocation information) to the transmitting unit 140. Further, the resource allocation unit 130 receives a HARQ ACK/NACK feedback transmission request from the controller 120 to apply the HARQ ACK/NACK feedback information to the transmitting unit 140. Still further, when resources are set to be sequentially allocated, the resource allocation unit 130 establishes the resource allocation information according to retransmission considering the HARQ operation mode of the wireless terminal, and applies the resource allocation information to the transmitting unit 140. In addition, the resource allocation unit 130 adjusts timing of the retransmission resource allocation according to the HARQ operation mode of the wireless terminal to allocate the retransmission resources.

The transmitting unit 140 that is a layer 1 control signaling subsystem (L1CSS) transmits the control information (e.g., the resource allocation information or the HARQ ACK/NACK information) through the radio channel, the control information being applied from the resource allocation unit 130.

The resource allocation method of the wireless communication system according to the exemplary embodiment of the present invention will now be described with reference to FIG. 2 to FIG. 4.

Figure 2:
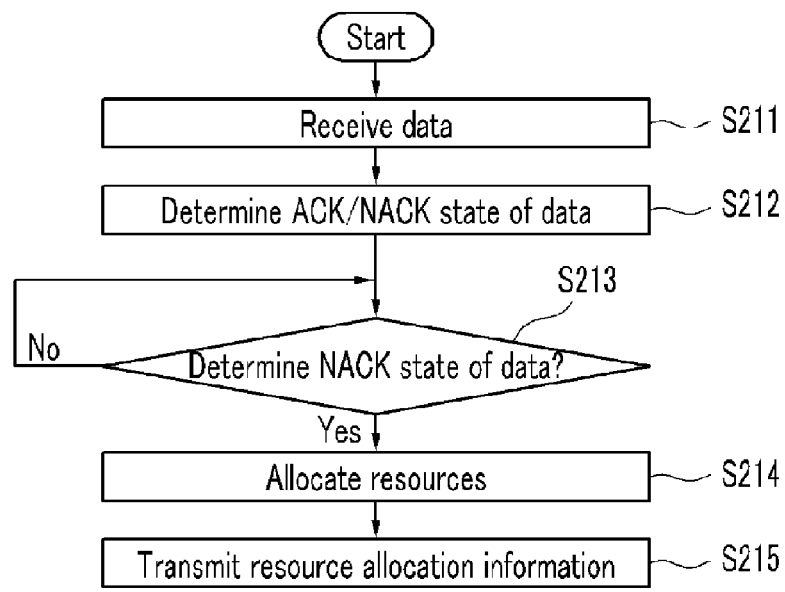
FIG. 2 is a flowchart representing an uplink retransmission resource allocation process of the wireless communication system according to the exemplary embodiment of the present invention.

FIG. 2 is a flowchart representing an uplink retransmission resource allocation process of the wireless communication system according to the exemplary embodiment of the present invention. FIG. 3 is a flowchart representing the uplink retransmission resource allocation process between the wireless terminal and the base station in the wireless communication system according to the exemplary embodiment of the present invention. FIG. 4 is a detailed flowchart representing the uplink retransmission resource allocation process between the wireless terminal and the base station in the wireless communication system according to the exemplary embodiment of the present invention.

The wireless terminal requests the base station to allocate the uplink resources when the terminal has uplink data to be transmitted to the base station. Then, the base station considers the uplink resource allocation request of the wireless terminals and the transmission data of the base station and allocates uplink resources to the wireless terminals.

Figure 3:
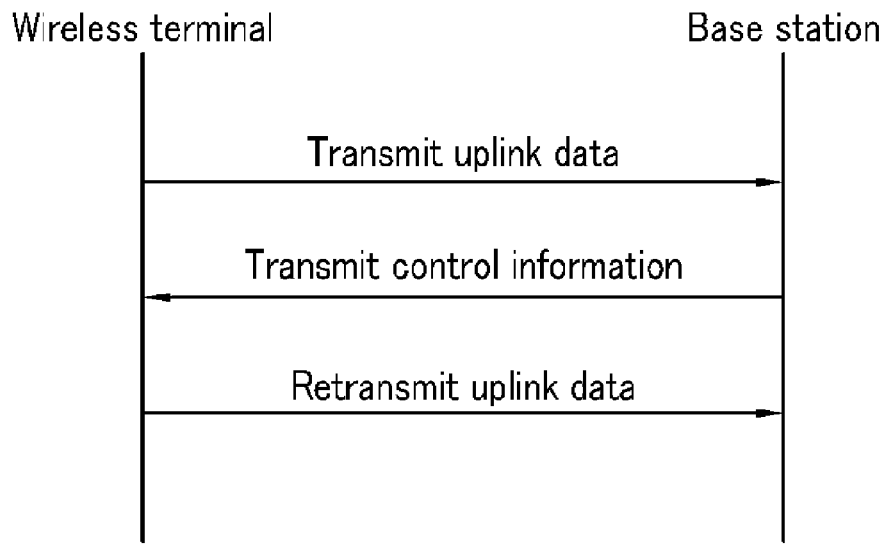
FIG. 3 is a flowchart representing an uplink retransmission resource allocation process between a wireless terminal and a base station in the wireless communication system according to the exemplary embodiment of the present invention.
Figure 4:
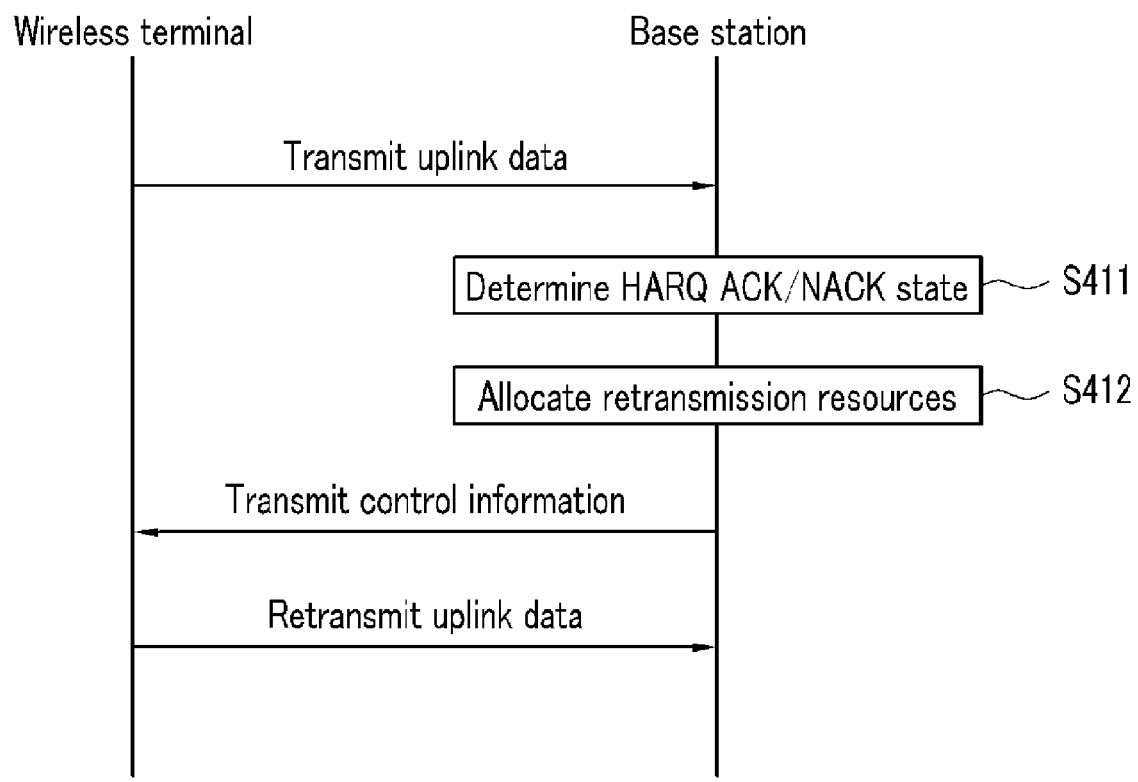
FIG. 4 is a detailed flowchart representing the uplink retransmission resource allocation process between the wireless terminal and the base station in the wireless communication system according to the exemplary embodiment of the present invention.

The wireless terminal transmits the uplink data to the base station as shown in FIGS. 3 and 4. The receiving unit 110 of the base station receives the uplink data from the corresponding wireless terminal as shown in FIG. 2 in step S211, decodes the received data, determines the ACK/NACK state of the decoded data in step S212, and transmit the ACK/NACK state of the received data to the controller 120 of the base station.

The controller 120 performs the HARQ ACK/NACK control operation based on the ACK/NACK state of the received data transmitted from the receiving unit 110. In this case, in the exemplary embodiment of the present invention, after receiving the uplink data, since the base station determines the HARQ ACK/NACK state in step S411 while allocating the retransmission resources in step S412 as shown in FIG. 4, the uplink retransmission resource allocation delay is minimized.

That is, the controller 120 determines the ACK/NACK state of the received data transmitted from the receiving unit 110, determines the NACK state of the received data in step S213 as shown in FIG. 2, and requests the resource allocation unit 130 to allocate the uplink retransmission resources.

In addition, when the state of the received data transmitted from the receiving unit 110 is the NACK state, the controller 120 requests the resource allocation unit 130 to transmit the HARQ ACK/NACK feedback according to the HARQ operation mode and method of the wireless terminal. In this case, the controller 120 transmits the HARQ ACK/NACK feedback information that is separated from the resource allocation information by using the transmitting unit 140 of the base station according to the HARQ operation method of the wireless terminal, or transmits the retransmission resource allocation information instead of the HARQ NACK feedback.

Further, the controller 120 determines whether the base station or the wireless terminal have the HARQ control initiative, and requests the resource allocation unit 130 to add the HARQ control information (e.g., a HARQ process identifier) to the retransmission resource allocation information to transmit according to the HARQ control initiative.

Then, the resource allocation unit 130 receives the uplink retransmission resource allocation request from the controller 120, allocates the retransmission resources at a time allowed by the system without a request from the wireless terminal in step S214, and applies the control information (e.g., the retransmission resource allocation information) to the transmitting unit 140. In addition, the resource allocation unit 130 receives the HARQ ACK/NACK feedback transmission request from the controller 120, independently transmits the retransmission resource allocation information and the HARQ ACK/NACK feedback information, or adds the HARQ ACK/NACK feedback information to the retransmission resource allocation information to transmit.

Here, in the exemplary embodiment of the present invention, while the resource allocation unit 130 is formed to allocate resources without a resource allocation request for retransmission from a user, the resource allocation information may be modified for retransmission when sequential resources (i.e., resources for another transmission) have been already received. In this case, in the exemplary embodiment of the present invention, since appropriate control information is transmitted according to the HARQ operation mode and method of the wireless terminal, retransmission delay for using the allocated resources may be reduced.

That is, when the resource allocation is sequentially scheduled and the controller 120 receives the uplink data of the NACK state through the receiving unit 110, the controller 120 forms the HARQ ACK/NACK feedback and the HARQ information in the resource allocation information to be appropriate for retransmission, and the resource allocation unit 130 forms the resource allocation information to be appropriate for retransmission considering the HARQ operation mode of the wireless terminal.

In addition to the resource allocation information, the resource allocation unit 130 may select transmission timing according to the HARQ operation mode of the wireless terminal. That is, the resource allocation unit 130 adjusts retransmission resource allocation timing according to the HARQ operation method of the wireless terminal to allocate the retransmission resources in step S214.

For example, timing is adjusted to transmit the resource allocation information in a case of synchronous HARQ, and quality of service (QoS) is considered to allocate the resources in a case of asynchronous HARQ.

Accordingly, the transmitting unit 140 transmits the control information (i.e., the retransmission resource allocation information, or the HARQ ACK/NACK feedback information) received from the resource allocation unit 130 to the wireless terminal in step S215.

In addition, the controller 120 requests the resource allocation unit 130 to transmit the control information for controlling the wireless terminal to not request the retransmission resource allocation to the wireless terminal, transmits the corresponding control information through the transmitting unit 140, and so sets the wireless terminal to not request the retransmission resource allocation. That is, according to the exemplary embodiment of the present invention, a predetermined user or all users may be permanently or temporarily limited to request the retransmission resource allocation, so that a protocol error may be minimized.

As described, according to the exemplary embodiment of the present invention, the base station simultaneously determines the ACK/NACK state of the received uplink data and allocates the retransmission resources, adjusts the retransmission resources allocation timing according to the HARQ operation mode to allocate retransmission resources, and independently transmits the retransmission resource allocation information and the HARQ ACK/NACK feedback information. In addition, according to the exemplary embodiment of the present invention, the HARQ ACK/NACK feedback information is transmitted while the HARQ ACK/NACK feedback information is included in the resource allocation information, so the resource allocation information may be modified for retransmission when sequential resources have been allocated.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for allocating resources in a wireless communication system, the method comprising:
    determining an ACK/NACK state of received data;
    allocating resources for retransmission when the received data are in the NACK state; and
    transmitting information for allocating the retransmission resources,
    wherein, in the allocating of the resources, the retransmission resources are allocated at a time allowed by a system without a resource allocation request for the retransmission from a wireless terminal.

2. The method of claim 1, further comprising, when the received data are in the NACK state, separately transmitting hybrid automatic repeat request (HARQ) ACK/NACK feedback information and the retransmission resource allocation information according to a HARQ operation mode of a wireless terminal.

3. The method of claim 1, further comprising, when the received data are in the NACK state, adding HARQ ACK/NACK feedback information to the retransmission resource allocation information and transmitting the HARQ ACK/NACK feedback information according to a HARQ operation mode of a wireless terminal.

4. The method of claim 1, further comprising:
    determining whether a base station or a wireless terminal has a HARQ control initiative; and
    adding HARQ control information to the retransmission resource allocation information and transmitting the HARQ control information according to the determined HARQ control initiative.

5. The method of claim 4, wherein the HARQ control information is a HARQ process identifier.

6. The method of claim 1, further comprising:
    determining whether resources have been sequentially allocated;
    determining the ACK/NACK state of the received data when the resources have been sequentially allocated; and
    modifying the information for allocating the resources to be appropriate for retransmission corresponding to a HARQ operation mode of a wireless terminal and transmitting the information when the received data are in the NACK state.

7. The method of claim 6, wherein, in the modifying and transmitting of the information for allocating the resources, HARQ ACK/NACK feedback information according to the HARQ operation mode and HARQ control information in the resource allocation information are formed to be appropriate for retransmission.

8. The method of claim 1, wherein, in the allocating of the retransmission resources, retransmission resource allocation timing is adjusted according to a HARQ operation mode of a wireless terminal.

9. The method of claim 1, further comprising control information for controlling a wireless terminal to not request retransmission resource allocation.

10. A resource allocation device in a wireless communication system, the device comprising:
    a receiving unit for receiving user data and determining an ACK/NACK state of the received data;
    a controller for determining a NACK state of the received data and requesting retransmission resource allocation;
    a resource allocation unit for allocating retransmission resources according to a request from the controller, and generating retransmission resource allocation information; and
    a transmitting unit for transmitting the retransmission resource allocation information of the resource allocation unit,
    wherein, in the allocating of the resources, the retransmission resources are allocated at a time allowed by a system without a resource allocation request for the retransmission from a wireless terminal.

11. The resource allocation device of claim 10, wherein, when the received data are in the NACK state, the controller requests HARQ ACK/NACK feedback transmission according to a HARQ operation mode of a wireless terminal, requests to add HARQ control information to the retransmission allocation information and transmit the HARQ control information according to a HARQ control initiative, or requests to transmit control information for controlling the wireless terminal to not request retransmission resource allocation.

* * * * *